US008259563B1

(12) United States Patent
Kothari et al.

(10) Patent No.: US 8,259,563 B1
(45) Date of Patent: Sep. 4, 2012

(54) FAST RESTORATION FOR PROVIDER EDGE NODE AND ACCESS LINK FAILURES

(75) Inventors: Bhupesh Kothari, San Jose, CA (US); Nischal Sheth, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 175 days.

(21) Appl. No.: 12/565,468

(22) Filed: Sep. 23, 2009

(51) Int. Cl.
*G01R 31/00* (2006.01)

(52) U.S. Cl. .......... 370/225; 370/228

(58) Field of Classification Search .......... 370/216–220, 370/225, 228, 248, 400, 401, 409
See application file for complete search history.

(56) References Cited

U.S. PATENT DOCUMENTS

| 7,308,198 | B1* | 12/2007 | Chudak et al. ................. | 398/58 |
| 7,830,785 | B2* | 11/2010 | Li et al. ........................ | 370/216 |
| 7,894,352 | B2* | 2/2011 | Kompella et al. .............. | 370/248 |
| 2008/0304407 | A1* | 12/2008 | Umansky et al. .............. | 370/222 |
| 2009/0161533 | A1* | 6/2009 | Ballantyne et al. ............ | 370/218 |
| 2010/0008220 | A1* | 1/2010 | Le Roux et al. ............... | 370/219 |
| 2010/0008222 | A1* | 1/2010 | Le Roux et al. ............... | 370/228 |
| 2010/0103813 | A1* | 4/2010 | Allan et al. .................... | 370/218 |
| 2010/0142370 | A1* | 6/2010 | Pan et al. ....................... | 370/228 |

FOREIGN PATENT DOCUMENTS

| WO | WO 2008/037917 | * 3/2008 |
| WO | WO 2008/037918 | * 3/2008 |

OTHER PUBLICATIONS

Kothari, B. et al., "VPLS Flush in BGP-Based Virtual Private LAN Service", draft-kothari-l2vpn-vpls-flush-00.txt, Internet-Draft, Oct. 27, 2008, 15 pages.

* cited by examiner

*Primary Examiner* — Kerri Rose
(74) *Attorney, Agent, or Firm* — Harrity & Harrity, LLP

(57) ABSTRACT

A first network device creates a protection path to a second network device associated with a first service site, and creates a pseudowire between the first service site and a second service site via the first network device and the second network device. The first network device also detects a failure between the first network device and the first service site, and forwards traffic, provided by the pseudowire between the first service site and the second service site, via the protection path. The second network device uses the traffic on the protection path as a trigger to activate a link between the second network device and the first service site.

22 Claims, 13 Drawing Sheets

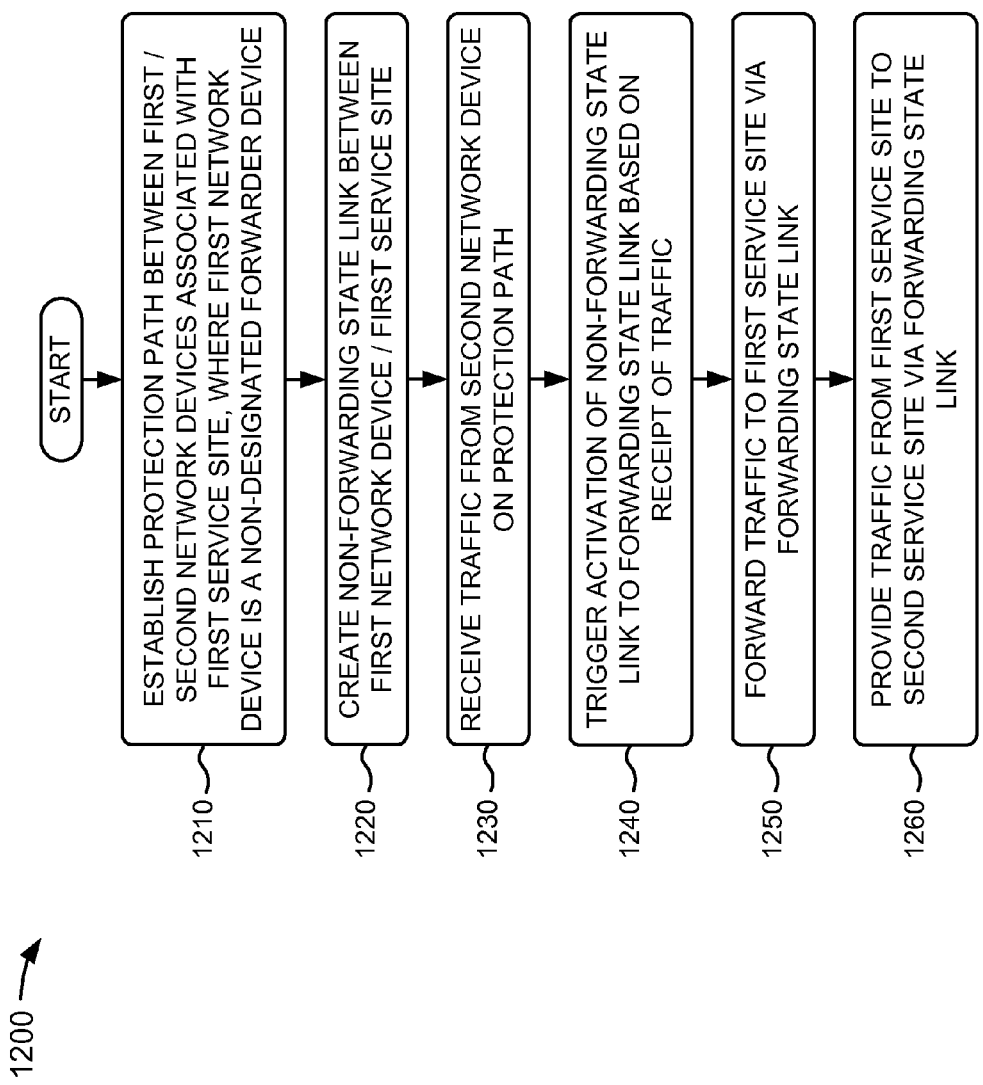

FAST RESTORATION FOR PROVIDER EDGE NODE AND ACCESS LINK FAILURES

BACKGROUND

Service providers (e.g., Internet service providers, telecommunications providers, etc.) have strict service level agreements (SLAs) for services they provide to their customers. Often, a requirement of a SLA is to provide an upper bound on service unavailability time due to failures within the service provider's infrastructure (including the infrastructure that connects customer equipment to service provider equipment). The upper bound on service unavailability time is required to be on the order of tens of milliseconds. That, in turn, requires fast connectivity restoration with a deterministic upper bound. Some service providers offer a virtual private local area network (LAN) service (VPLS) (e.g., a way to provide Ethernet-based multipoint to multipoint communication over Internet protocol (IP)/multiprotocol label switching (MPLS) networks) to their customers. In order to provide connectivity restoration with a deterministic upper bound for VPLS, service providers have to address three types of failures: (1) access link failures; (2) provider edge (PE) node (e.g., network device) failures; and (3) penultimate (or provider (P)) node or core link failures.

Existing solutions rely on the control plane to converge before customer service is restored. Since control plane convergence is not deterministic, and thus cannot be predicted beforehand, it is often not an acceptable solution for service providers who have to design their network to meet SLAs that require fast and deterministic service restoration for their customers. Furthermore, there are no existing solutions that provide fast connectivity restoration with a deterministic upper bound for VPLS when access link failures (e.g., type (1) failures) and PE node failures (e.g., type (2) failures) occur.

SUMMARY

According to one aspect, a first network device may include a memory to store instructions, and a processor to execute instructions in the memory to: create a protection path to a second network device associated with a first service site, create a pseudowire between the first service site and a second service site via the first network device and the second network device, detect a failure between the first network device and the first service site, and forward traffic, provided by the pseudowire between the first service site and the second service site, via the protection path. The second network device may use the traffic on the protection path as a trigger to activate a link between the second network device and the first service site.

According to another aspect, a first network device may include a memory to store instructions, and a processor to execute instructions in the memory to: establish a protection path with a second network device associated with a first service site, create a non-forwarding state link between the first network device and the first service site, receive traffic from the second network device on the protection path, trigger activation of the non-forwarding state link to a forwarding state link based on receipt of the traffic, and forward traffic from a second service site to the first service site via the forwarding state link.

According to still another aspect, a network device-implemented method may include creating, by the network device, a protection path to another network device associated with a first service site, and creating a pseudowire between the first service site and a second service site via the network device and the other network device. The method may also include detecting, by the network device, a failure between the network device and the first service site, and forwarding, by the network device, traffic, provided by the pseudowire between the first service site and the second service site, via the protection path. The other network device may use the traffic on the protection path as a trigger to activate a link between the other network device and the first service site.

According to a further aspect, a network device-implemented method may include establishing, by the network device, a protection path with another network device associated with a first service site, where the network device is a non-designated forwarder device for the first service site, and the other network device is a designated forwarder device for the first service site. The method may also include creating, by the network device, a non-forwarding state link between the network device and the first service site, receiving, by the network device, traffic from the other network device on the protection path, triggering, by the network device, activation of the non-forwarding state link to a forwarding state link based on receipt of the traffic, and forwarding, by the network device, traffic from a second service site to the first service site via the forwarding state link.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 12 depicts a flow chart of an exemplary process for providing fast and deterministic service restoration via a redundant PE node according to implementations described herein.

DETAILED DESCRIPTION

Figure 1:
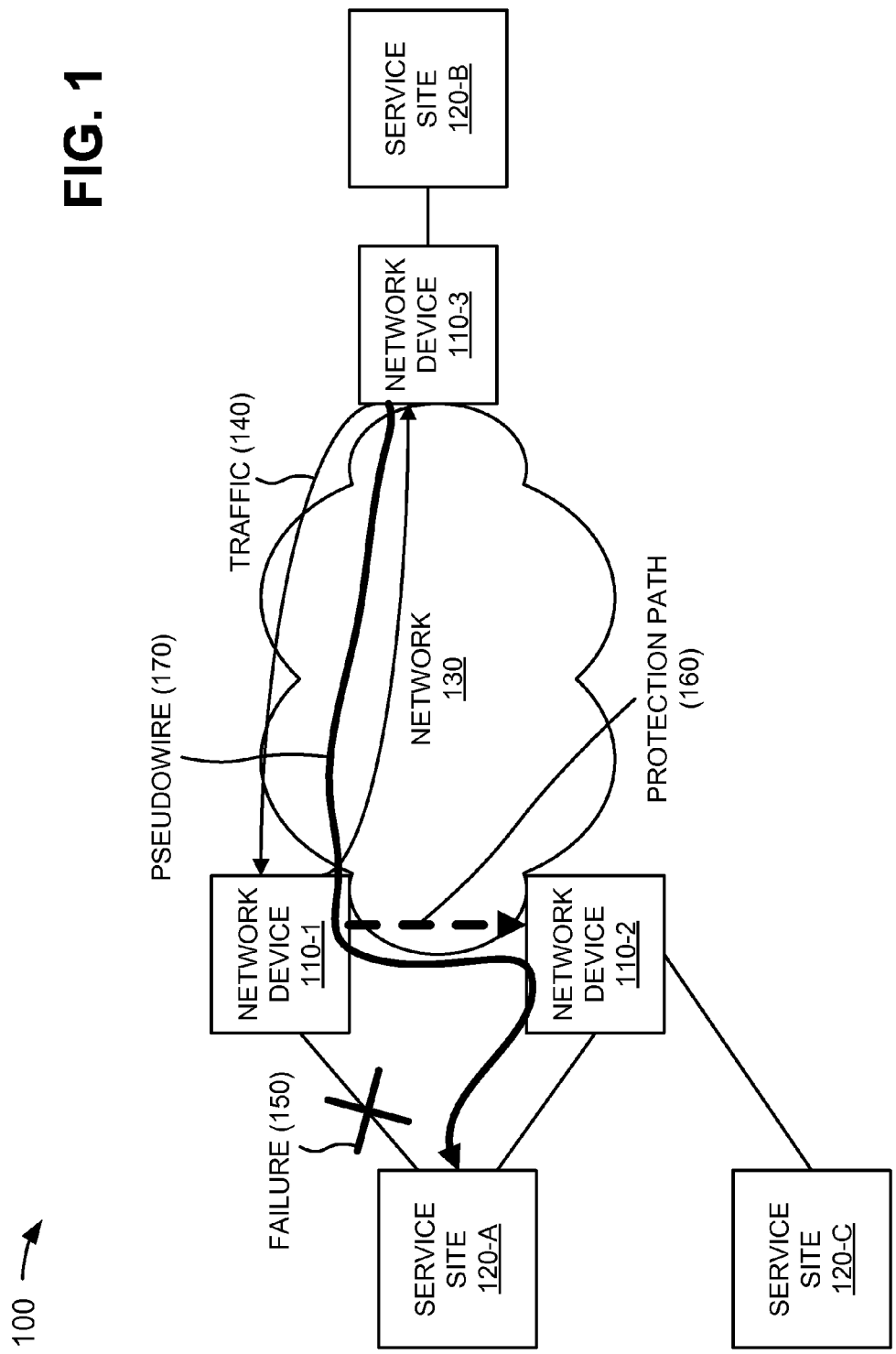
FIG. 1 depicts a diagram of an exemplary network in which systems and/or methods described herein may be implemented.

The following detailed description refers to the accompanying drawings. The same reference numbers in different drawings may identify the same or similar elements. Also, the following detailed description does not limit the invention.

Systems and/or methods described herein may provide fast and deterministic service restoration in case of access link failures (e.g., type (1) failures) and/or PE node failures (e.g., type (2) failures). The systems and/or methods may be applicable to border gateway protocol (BGP)-based VPLS, label distribution protocol (LDP)-based VPLS, and BGP-based layer 2 virtual private networks (L2VPN).

For redundancy, customer sites (e.g., service sites) are typically multi-homed to different PE network devices. In the systems and/or methods described herein, among the set of PE network devices in a redundancy group, one PE network device may act as a designated forwarder (DF) of traffic and other PE network devices may act as non-designated forwarders (non-DF) of traffic. For access link failures (e.g., type (1) failures) and/or PE node failures (e.g., type (2) failures), the systems and/or methods may re-route traffic to a non-DF that is also providing redundancy to the same service site. The systems and/or methods may re-route to the non-DF via a data path and without control plane interaction. Prior to a failure, the systems and/or methods may create a state in the forwarding and control plane that is needed for re-routing. In the event of a failure, the systems and/or methods may restore connectivity in the data path, which may provide a deterministic restoration time on the order of tens of milliseconds (e.g., within a range of about ten milliseconds to about ninety-nine milliseconds).

The PE network devices that are multi-homed may create protection paths to each other. In case of access link failures, these protection paths may be used by the systems and/or methods to re-route traffic received from other network devices. The protection paths may be identified by the systems and/or methods via particular MPLS labels (e.g., protection labels) that may be carried in L2VPN network layer reachability information (NLRI). Data traffic carried on a protection path may be used by the systems and/or methods as a trigger by the non-DF PE network device to activate a protection mechanism. To avoid duplicate traffic, the systems and/or methods may use point-to-multipoint (P2MP) mechanisms, to differentiate unicast traffic from multicast and unknown unicast traffic, or may not use P2MP. The systems and/or methods may use a control protocol (e.g., a link aggregation control protocol (LACP)) between a service site and a PE network device to reduce bandwidth wastage and avoid traffic convergence time when traffic is unidirectional. In case of PE network device failure, the systems and/or methods may use context labels to re-route traffic by a provider (P) network device to a non-DF network device.

When an access link failure occurs, a DF network device may notify other PE network devices about the access link failure using a control plane message. As the control plane message traverses through the network, different PE network devices may receive the control plane message at different times. A BGP stateless message (e.g., as described in "http://tools.ietf.org/html/draft-kothari-l2vpn-vpls-flush-00") or a new BGP community may be used to synchronize the different PE network devices. Synchronizing the PE network devices may eliminate a need for the DF network device to differentiate broadcast traffic from unicast traffic during fast failover.

With the systems and/or methods described herein, an upper bound on a time it takes for traffic to converge (e.g., be restored) for access link failures (e.g., type (1) failures) and/or PE node failures (e.g., type (2) failures) may be predictable. Such predictability may be useful for service providers during design of their networks and service offerings.

Exemplary Network

FIG. 1 depicts a diagram of an exemplary network in which systems and/or methods described herein may be implemented. As illustrated, network 100 may include one or more network devices 110-1, 110-2, and 110-3 (collectively referred to as "network devices 110" and singularly as "network device 110") and one or more service sites 120-A, 120-B, and 120-C (collectively referred to as "service sites 120" and singularly as "service site 120") interconnected by a network 130. Components of network 100 may interconnect via wired and/or wireless connections or links. Three network devices 110, three service sites 120, and a single network 130 have been illustrated in FIG. 1 for simplicity. In practice, there may be more network devices 110, service sites 120, and/or networks 130. Also, in some instances, one or more of the components of network 100 may perform one or more tasks described as being performed by another one or more of the components of network 100.

Network device 110 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. In one implementation, each of network devices 110 may include a provider edge (PE) network device associated with a service provider. In another implementation, each of network devices 110 may include a device that is capable of transmitting information to and/or receiving information from other network devices 110 and/or service sites 120 via network 130.

Service site 120 may include one or more server devices, or other types of computation or communication devices, that gather, process, search, and/or provide information in a manner described herein. In one implementation, service site 120 may correspond to one or more devices of a customer that receives services provided by a service provider (e.g., via network devices 110 and network 130). For example, service site 120-A may correspond to a computer provided in a customer's home, service site 120-B may correspond to the Internet, and the service provider may correspond to an Internet service provider that provides the customer (e.g., service site 120-A) access to the Internet (e.g., service site 120-B) via network devices 110 and network 130.

Network 130 may include one or more networks of any type. For example, network 130 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks. In one exemplary implementation, network 130 may be associated with a service provider.

As further shown in FIG. 1, network device 110-3 may provide traffic 140 from service site 120-B to service site 120-A via network device 110-1. With current systems, if a failure 150 occurs in a link between service site 120-A and network device 110-1, traffic to and from service site 120-A is dropped. Network device 110-1 may detect an access link failure 150 and may send a BGP update to network device 110-3. Based on the BGP update, network device 110-3 may elect network device 110-2 as a traffic forwarder, and may provide traffic 140 (e.g., packet or non-packet data) from service site 120-B to service site 120-A via network device 110-2. Such an arrangement provides slow and non-deterministic service restoration. Systems and/or methods described herein may address this by re-routing traffic 140 from network device 110-1 (e.g., a designated forwarder) to network device 110-2 (e.g., a non-designated forwarder) since both network devices are associated with service site 120-A. In one implementation, network device 110-1 may create a protection path 160 to network device 110-2, and a pseudowire 170 may be created between service sites 120-A and 120-B via network devices 110-1, 110-2, and 110-3. Pseudowire 170 may include a mechanism that emulates various networking or telecommunications services across packet-switched networks that use Ethernet, IP, MPLS, etc. Network device 110-1 may detect link failure 150 (e.g., via Institute of Electrical and Electronics Engineers (IEEE) 802.3ah, 802.1ag, etc. mechanisms), and may forward traffic 140, via protection path 160 and pseudowire 170, to network device 110-2. Network device 110-2 may receive traffic 140 and may use receipt of traffic 140 via protection path 160 as a trigger to activate an access link between network device 110-2 and service site 120-A. Network device 110-2 may provide traffic 140 to service site 120-A via the activated link.

If network device 110-2 is a non-designated forwarder to service site 120-A, the link between network device 110-2 and service site 120-A may initially be in a non-forwarding state. While the link between network device 110-2 and service site 120-A is in the non-forwarding state, network device 110-2 may not forward traffic received from remote PE network devices or from attached service sites (e.g., service site 120-C) on the non-forwarding state link. Network device 110-2 may install a discard next hop for the non-forwarding state link so that traffic received on the non-forwarding state link will be dropped as long as the link is in the non-forwarding state. When network device 110-2 receives traffic 140 via protection path 160, network device 110-2 may utilize receipt of such traffic 140 as a trigger to activate the link between network device 110-2 and service site 120-A. When the link between network device 110-2 and service site 120-A is activated, the link may be in a forwarding state and network device 110-2 may forward traffic via the activated link.

Although FIG. 1 shows exemplary components of network 100, in other implementations, network 100 may contain fewer, different, differently arranged, or additional components than depicted in FIG. 1. For example, network 130 may include one or more provider (P) network devices and/or one or more core links (e.g., associated with a service provider) that may interconnect with network devices 110.

Exemplary Network Device Configuration

Figure 2:
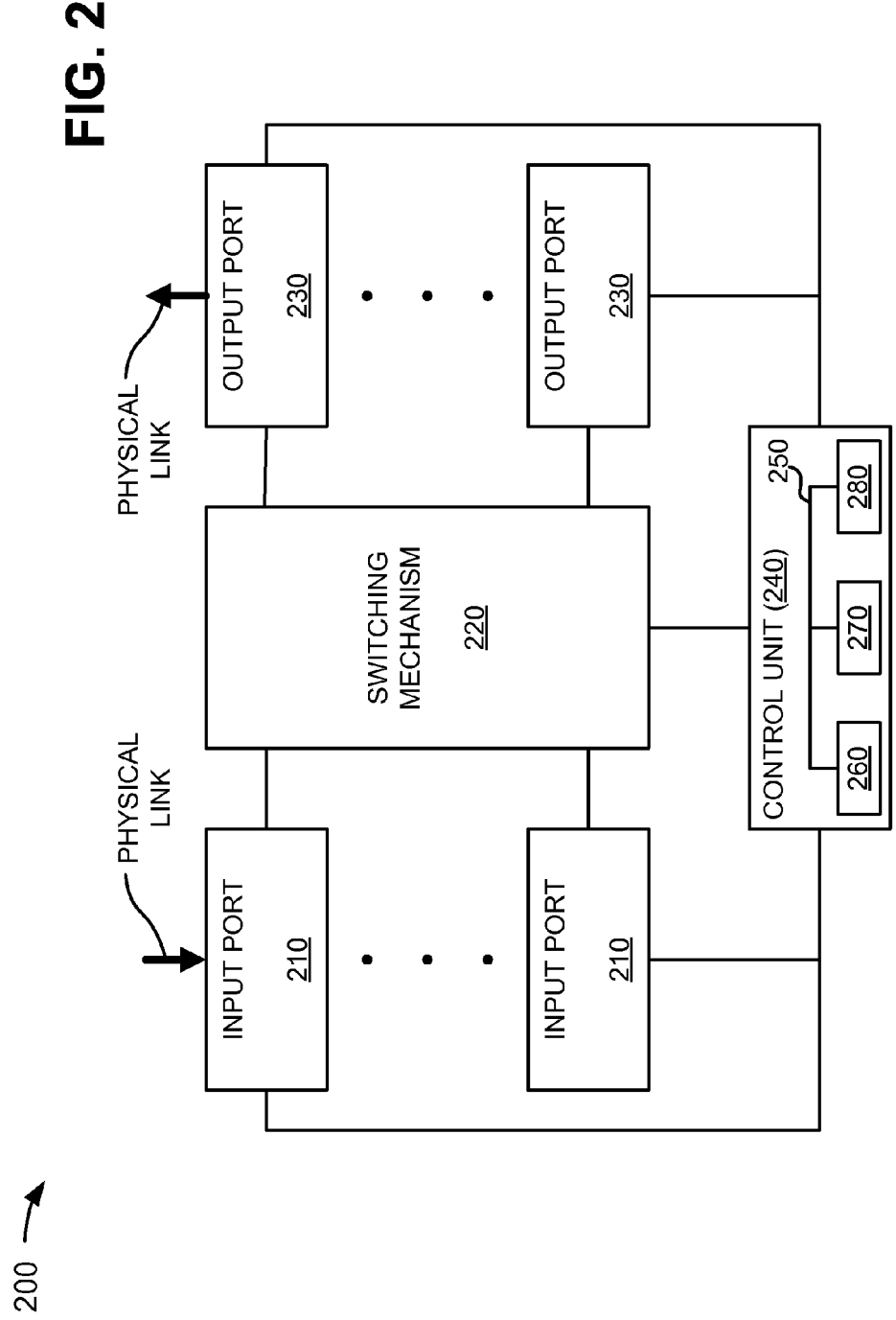
FIG. 2 illustrates a diagram of exemplary components of a network device depicted in FIG. 1.

FIG. 2 illustrates a diagram of exemplary components of a device 200 that may correspond to one of network devices 110 depicted in FIG. 1. As shown, device 200 may include input ports 210, a switching mechanism 220, output ports 230, and a control unit 240.

Input ports 210 may be the point of attachment for a physical link and may be the point of entry for incoming traffic. Input ports 210 may carry out data link layer encapsulation and decapsulation. Input ports 210 may look up a destination address of incoming traffic in a forwarding table to determine its destination port (i.e., route lookup). In other implementations, input ports 210 may send (e.g., may be an exit point) and/or receive (e.g., may be an entry point) traffic.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store traffic and may schedule traffic for service on an output link (e.g., a physical link). Output ports 230 may include scheduling algorithms that support priorities and guarantees. Output ports 230 may support data link layer encapsulation and decapsulation, and/or a variety of higher-level protocols. In other implementations, output ports 230 may send traffic (e.g., may be an exit point) and/or receive traffic (e.g., may be an entry point).

Control unit 240 may use routing protocols and one or more forwarding tables for forwarding traffic. Control unit 240 may interconnect with input ports 210, switching mechanism 220, and output ports 230. Control unit 240 may compute a forwarding table, implement routing protocols, and/or run software to configure and manage device 200. Control unit 240 may handle any traffic whose destination address may not be found in the forwarding table.

In one implementation, control unit 240 may include a bus 250 that may include a path that permits communication among a processor 260, a memory 270, and a communication interface 280. Processor 260 may include one or more processors, microprocessors, or other types of processing units that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Device 200 may perform certain operations, as described in detail below. Device 200 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

Exemplary Network Interactions

Figure 3:
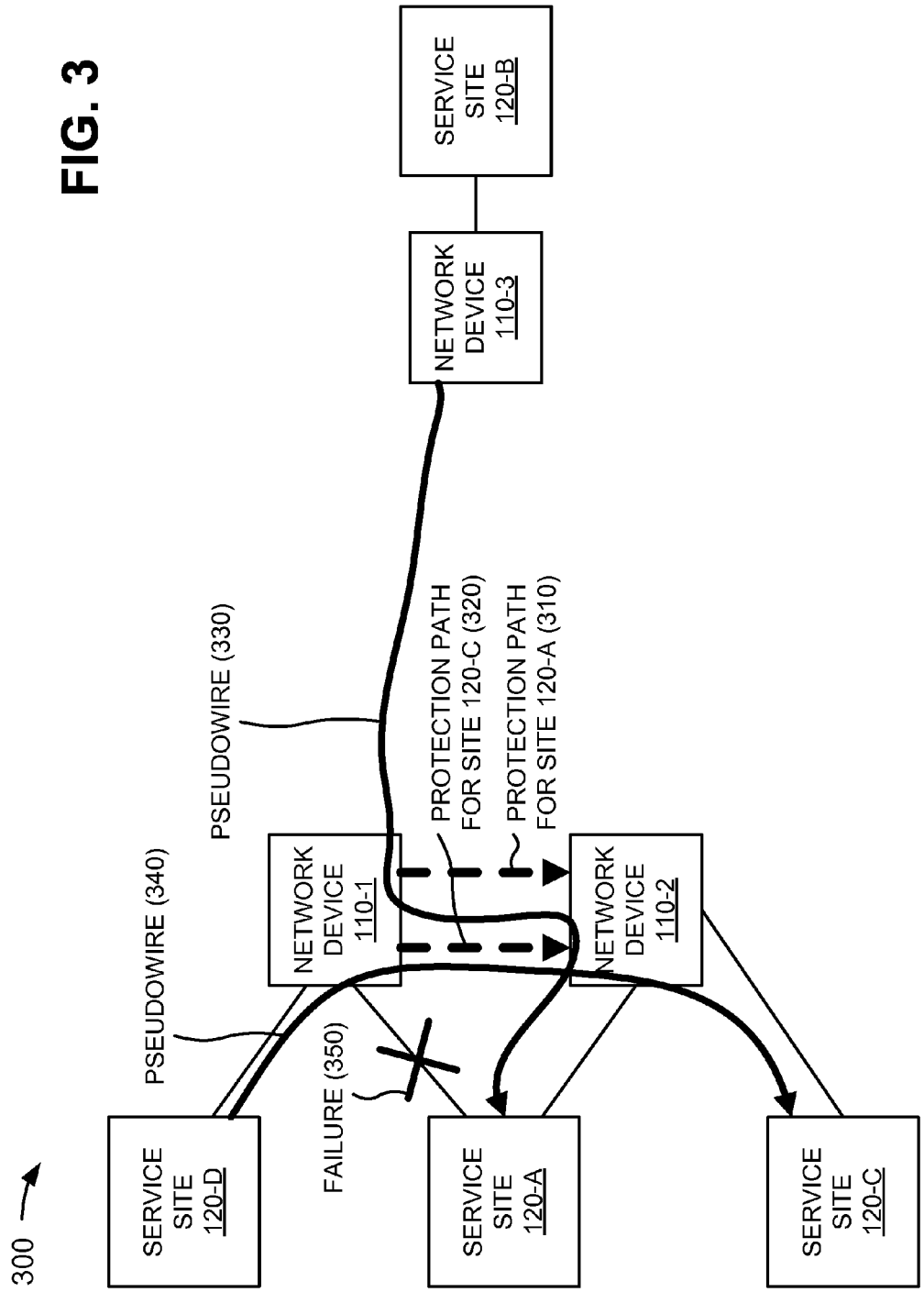
FIG. 3 depicts a diagram of exemplary interactions among components of an exemplary portion of the network illustrated in FIG. 1.

FIG. 3 depicts a diagram of exemplary interactions among components of an exemplary portion 300 of network 100. As illustrated, exemplary network portion 300 may include network devices 110-1, 110-2, and 110-3 and service sites 120-A, 120-B, 120-C, and 120-D. Network devices 110-1, 110-2, and 110-3 and service sites 120-A, 120-B, and 120-C may include the features described above in connection with, for example, FIGS. 1 and 2. Service site 120-D may include features similar to features described above in connection with service sites 120-A, 120-B, and/or 120-C.

As further shown in FIG. 3, network device 110-1 may create a protection path 310 for service site 120-A, and may create a protection path 320 for service site 120-C. In an exemplary implementation, network device 110-1 may create protection paths for every service site (e.g., every VPLS instance) associated with a non-designated forwarder (e.g., network device 110-2) so that network device 110-2 may uniquely identify which access link to forward traffic received on a particular protection path. Protection paths 310 and 320 may carry traffic from network device 110-1 to network device 110-2 if a failure occurs in an access link between network device 110-1 and service site 120-A.

A pseudowire 330 may be created between service sites 120-A and 120-B, via network devices 110-1, 110-2, and 110-3, based on protection path 310. Another pseudowire 340 may be created between service sites 120-C and 120-D, via network devices 110-1 and 110-2, based on protection path 320. In one exemplary implementation, if network device 110-1 detects a link failure 350 (e.g., via IEEE 802.3ah, 802.1ag, etc. mechanisms) in the access link between network device 110-1 and service site 120-A, network device 110-1 may provide a warning packet (e.g., a "cooked" packet) on protection path 310 to network device 110-2. Network device 110-2 may receive the cooked packet and may use receipt of the cooked packet via protection path 310 as a trigger to activate an access link between network device 110-2 and service site 120-A. Network device 110-2 may provide traffic to/from service site 120-A via the activated link. Similarly, if network device 110-1 detects link failure 350, network device 110-1 may provide a cooked packet on protection path 320 to network device 110-2. Network device 110-2 may receive the cooked packet and may use receipt of the cooked packet via protection path 320 as a trigger to activate an access link between network device 110-2 and service site 120-C. Network device 110-2 may provide traffic to/from service site 120-C via the activated link.

Although FIG. 3 shows exemplary components of network portion 300, in other implementations, network portion 300 may contain fewer, different, differently arranged, or additional components than depicted in FIG. 3. In still other implementations, one or more components of network portion 300 may perform one or more other tasks described as being performed by one or more other components of network portion 300.

Figure 4:
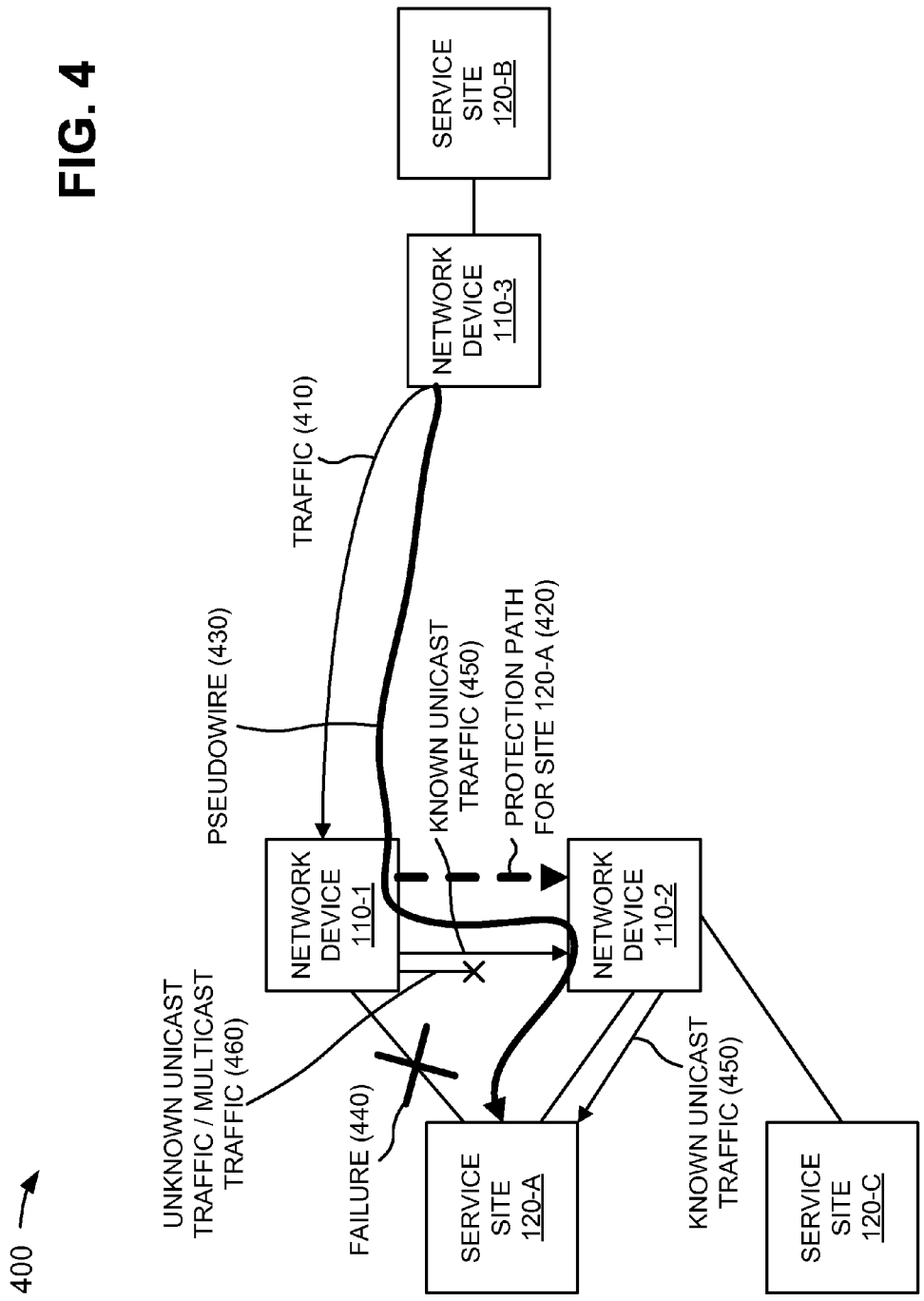
FIG. 4 illustrates a diagram of exemplary interactions among components of another exemplary portion of the network depicted in FIG. 1.

FIG. 4 illustrates a diagram of exemplary interactions among components of another exemplary portion 400 of network 100. As shown, exemplary network portion 400 may include network devices 110-1, 110-2, and 110-3 and service sites 120-A, 120-B, and 120-C. Network devices 110-1, 110-2, and 110-3 and service sites 120-A, 120-B, and 120-C may include the features described above in connection with, for example, FIGS. 1-3.

As further shown in FIG. 4, network device 110-1 may receive traffic 410 (e.g., destined for service site 120-A) from service site 120-B via network device 110-3. Network device 110-1 may create a protection path 420 that may carry traffic 410 from network device 110-1 to network device 110-2 if a failure occurs in an access link between network device 110-1 and service site 120-A. A pseudowire 430 may be created between service sites 120-A and 120-B, via network devices 110-1, 110-2, and 110-3, based on protection path 420. In one exemplary implementation, if network device 110-1 detects a link failure 440 (e.g., via IEEE 802.3ah, 802.1ag, etc. mechanisms), network device 110-1 may provide a warning packet (e.g., a "cooked" packet) on protection path 420 to network device 110-2. Network device 110-2 may receive the cooked packet and may use receipt of the cooked packet via protection path 420 as a trigger to activate an access link between network device 110-2 and service site 120-A. Network device 110-2 may provide traffic to/from service site 120-A via the activated link.

In one exemplary implementation, network device 110-1 may or may not forward traffic via protection path 420 (e.g., based on a traffic type). For example, if network device 110-1 receives (e.g., via pseudowire 430) known unicast traffic 450 (e.g., traffic from one source to one destination), network device 110-1 may forward known unicast traffic 450 to network device 110-2 via protection path 420. Network device 110-2, in turn, may forward known unicast traffic 450 to service site 120-A via the link between service site 120-A and network device 110-2. However, if network device 110-1 receives (e.g., via pseudowire 430) unknown unicast traffic and/or multicast traffic 460 (e.g., traffic from one source to multiple destinations), network device 110-1 may not forward unknown unicast traffic/multicast traffic 460 to network device 110-2 via protection path 420. Network device 110-1 may prevent forwarding of unknown unicast traffic/multicast traffic 460 via protection path 420 in order to avoid duplicate traffic to service site 120-A. Unknown unicast traffic/multicast traffic 460 may be received by network device 110-2 from remote PE network devices due to the presence of service site 120-C (e.g., for which network device 110-2 is a designated forwarder).

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400.

Figure 5:
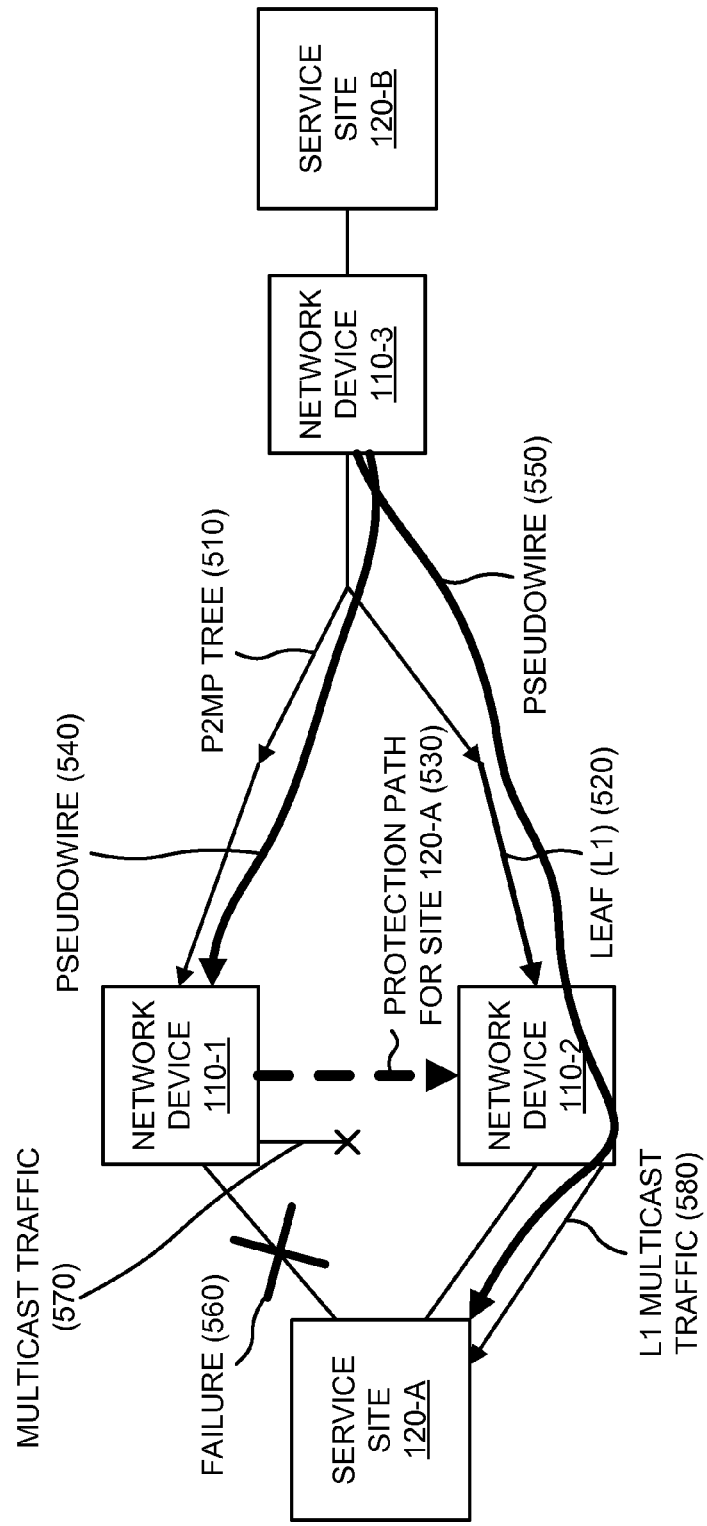
FIG. 5 depicts a diagram of exemplary interactions among components of still another exemplary portion of the network illustrated in FIG. 1.

FIG. 5 depicts a diagram of exemplary interactions among components of still another exemplary portion 500 of network 100. As shown, exemplary network portion 500 may include network devices 110-1, 110-2, and 110-3 and service sites 120-A and 120-B. Network devices 110-1, 110-2, and 110-3 and service sites 120-A and 120-B may include the features described above in connection with, for example, FIGS. 1-4.

As further shown in FIG. 5, traffic may be provided by network device 110-3 via a point-to-multipoint (P2MP) tree 510. P2MP tree 510 may include a first branch (or route) between network device 110-1 and network device 110-3, and a second branch (or route) between network device 110-2 and network device 110-3. The second branch of P2MP tree 510 may include a leaf (L1) 520 (e.g., a link) to network device 110-2. Network device 110-1 may create a protection path 530 that may carry traffic from network device 110-1 to network device 110-2 if a failure occurs in an access link between network device 110-1 and service site 120-A. A pseudowire 540 may be created between service sites 120-A and 120-B, via network devices 110-1 and 110-3, based on the first branch of P2MP tree 510. Another pseudowire 550 may be created between service sites 120-A and 120-B, via network devices 110-2 and 110-3, based on the second branch of P2MP tree 510.

In one exemplary implementation, if network device 110-1 detects a link failure 560 (e.g., via IEEE 802.3ah, 802.1ag, etc. mechanisms), network device 110-1 may provide a warning packet (e.g., a "cooked" packet) on protection path 530 to network device 110-2. Network device 110-2 may receive the cooked packet and may use receipt of the cooked packet via protection path 530 as a trigger to activate an access link between network device 110-2 and service site 120-A. Network device 110-2 may provide traffic to/from service site 120-A via the activated link. In one exemplary implementation, if network device 110-1 receives multicast traffic 570 via the first branch of P2MP tree 510, network device 110-1 may not provide multicast traffic 570 to network device 110-2 via protection path 530. This may prevent duplicate traffic to service site 120-A. However, if network device 110-2 receives multicast traffic 580 via leaf (L1) 520 of P2MP tree 510, network device 110-2 may provide L1 multicast traffic 580 to service site 120-A via the link between network device 110-2 and service site 120-A. If leaf (L1) 520 does not exist (e.g., indicating that network device 110-2 is a non-designated forwarder), network device 110-2 may establish leaf (L1) 520 so that multicast traffic 580 may be received and provided to service site 120-A.

If P2MP tree 510 does not exist, network device 110-3 may still create pseudowire 550 to network device 110-2 even though network device 110-2 is a non-designated forwarder. In one example, network device 110-2 may provide information (e.g., via a bit), to network device 110-3, indicating that network device 110-3 should create pseudowire 550 to network device 110-2.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

Figure 6:
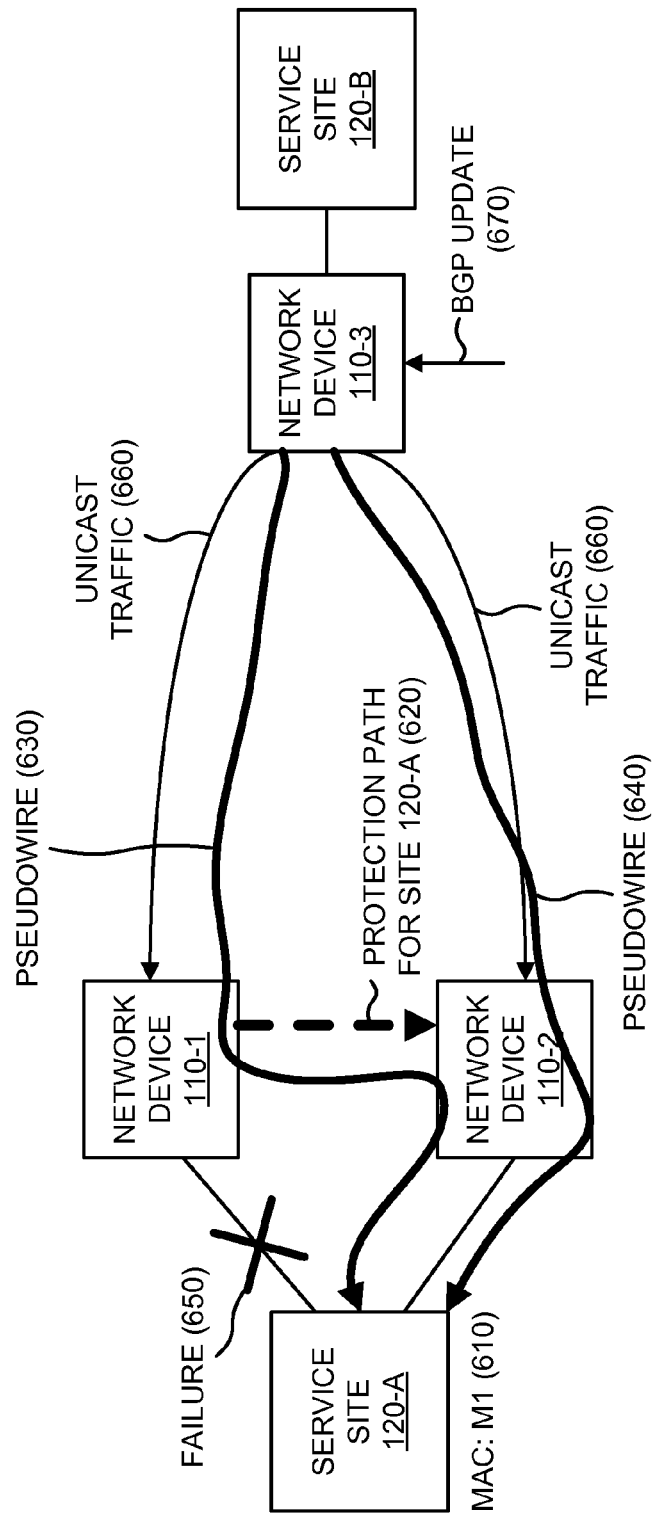
FIG. 6 illustrates a diagram of exemplary interactions among components of a further exemplary portion of the network depicted in FIG. 1.

FIG. 6 illustrates a diagram of exemplary interactions among components of a further exemplary portion 600 of network 100. As shown, exemplary network portion 600 may include network devices 110-1, 110-2, and 110-3 and service sites 120-A and 120-B. Network devices 110-1, 110-2, and 110-3 and service sites 120-A and 120-B may include the features described above in connection with, for example, FIGS. 1-5.

As further shown in FIG. 6, a media access control (MAC) address (M1) 610 may be associated with service site 120-A. MAC address 610 may be known or unknown to network device 110-1 and/or network device 110-3. Network device 110-1 may create a protection path 620 that may carry traffic from network device 110-1 to network device 110-2 if a failure occurs in an access link between network device 110-1 and service site 120-A. A pseudowire 630 may be created between service sites 120-A and 120-B, via network devices 110-1, 110-2, and 110-3, based on protection path 620. Another pseudowire 640 may be created between service sites 120-A and 120-B, via network devices 110-2 and 110-3.

In one exemplary implementation, if network device 110-1 detects a link failure 650 (e.g., via IEEE 802.3ah, 802.1ag, etc. mechanisms), network device 110-1 may provide a warning packet (e.g., a "cooked" packet) on protection path 620 to network device 110-2. Network device 110-2 may receive the cooked packet and may use receipt of the cooked packet via protection path 620 as a trigger to activate an access link between network device 110-2 and service site 120-A. Network device 110-2 may provide traffic to/from service site 120-A via the activated link.

If MAC address 610 is unknown to network device 110-3 and is known to network device 110-1, unicast traffic 660 provided to network device 110-1 may be provided to service site 120-A, via network device 110-2 and pseudowire 630 (e.g., based on protection path 620), and the same unicast traffic 660 may be provided to service site 120-A via network device 110-2 and pseudowire 640. Such duplicate unicast traffic 660 may be provided to service site 120-A until network device 110-3 receives a BGP update. However, such duplicate unicast traffic 660 may be avoided if network device utilizes P2MP for flooding traffic. If MAC address 610 is known to network device 110-3 and is unknown to network device 110-1, unicast traffic 660 may be dropped until network device 110-3 receives the BGP update. Such a situation, however, may be unlikely.

In one exemplary implementation, network device 110-1 may include the following construct for MAC address 610:
CE Intf (for Site A) [Primary]
    Inh [Standby]
        [Tunnel Label, Protection Label, . . . ],
where "CE Intf" may represent a customer equipment (CE) interface (e.g., the link between network device 110-1 and service site 120-A) and "Inh" may represent an indirect next hop. Network device 110-1 may include the following construct for a default flood route:
CE Intf 1
    . . .
        CE Intf (for Site A) [Primary]
            Inh [Standby]
                [Tunnel Label, Protection Label, . . . ].
If the CE interface fails, the protection label (e.g., a portion of the indirect next hop) may be used by network device 110-1 for traffic destined for service site 120-A. Network device 110-1 may delete MAC address 610 if the CE interface fails since the flood route may send traffic to network device 110-2. As network devices 110 converge, traffic to service site 120-A may be sent to network device 110-2 rather than to network device 110-1. When the CE interface is re-established, MAC-based routes may use the CE interface as a next hop rather than as an indirect next hop that contains protection labels.

In one exemplary implementation, a protection label may be used to establish a protection path (e.g., protection path 620). A type-length-value (TLV) may be attached after a L2VPN NLRI (e.g., in a packet) and may carry protections labels. A network device advertising a protection label value for an associated service site may expect to receive traffic with the label on the protection path. Multiple multi-homed PE network devices may be supported by assigning protection labels for each member PE network device within a redundancy group.

If network device 110-1 receives traffic (e.g., destined for another device of network 100) from service site 120-A via network device 110-2, MAC address 610 may not be learned over pseudowire 630. However, network device 110-1 may need to know MAC address 610 so that unicast traffic (e.g., for service site 120-A) from remote PE network devices may travel over protection path 620. Such a situation may continue until all remote PE network devices have converged.

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

Figure 7A:
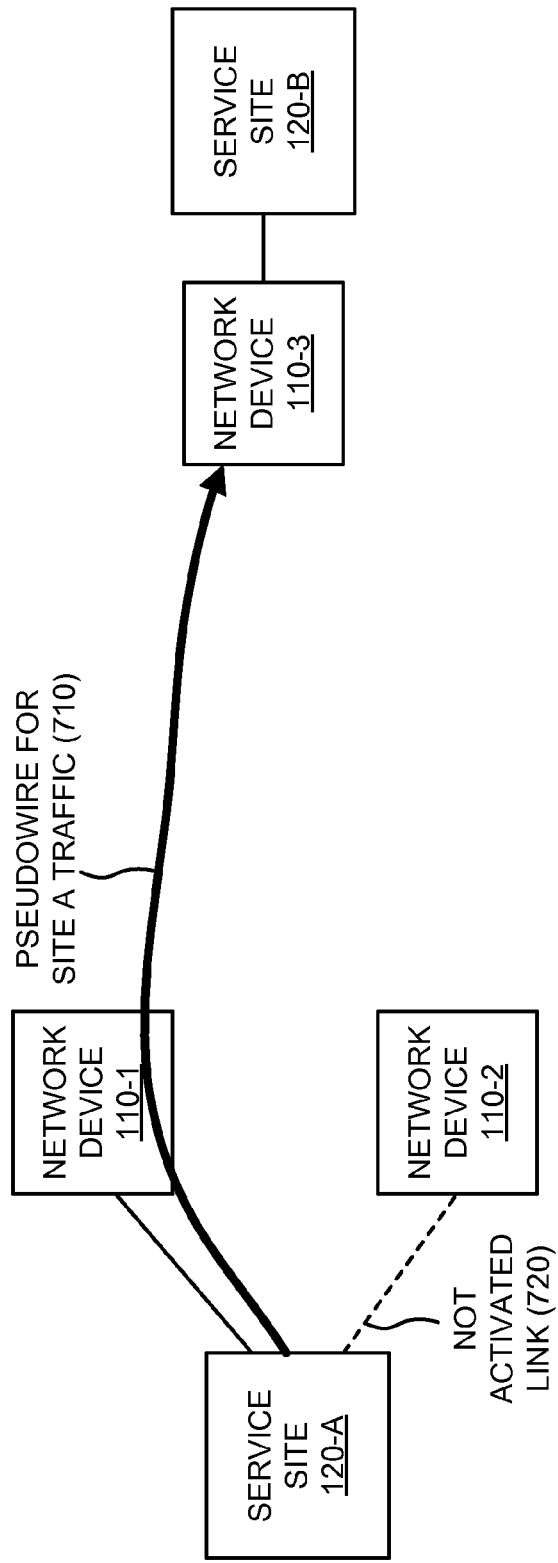
FIGS. 7A and 7B depict diagrams of exemplary interactions among components of still a further exemplary portion of the network illustrated in FIG. 1.
Figure 7B:
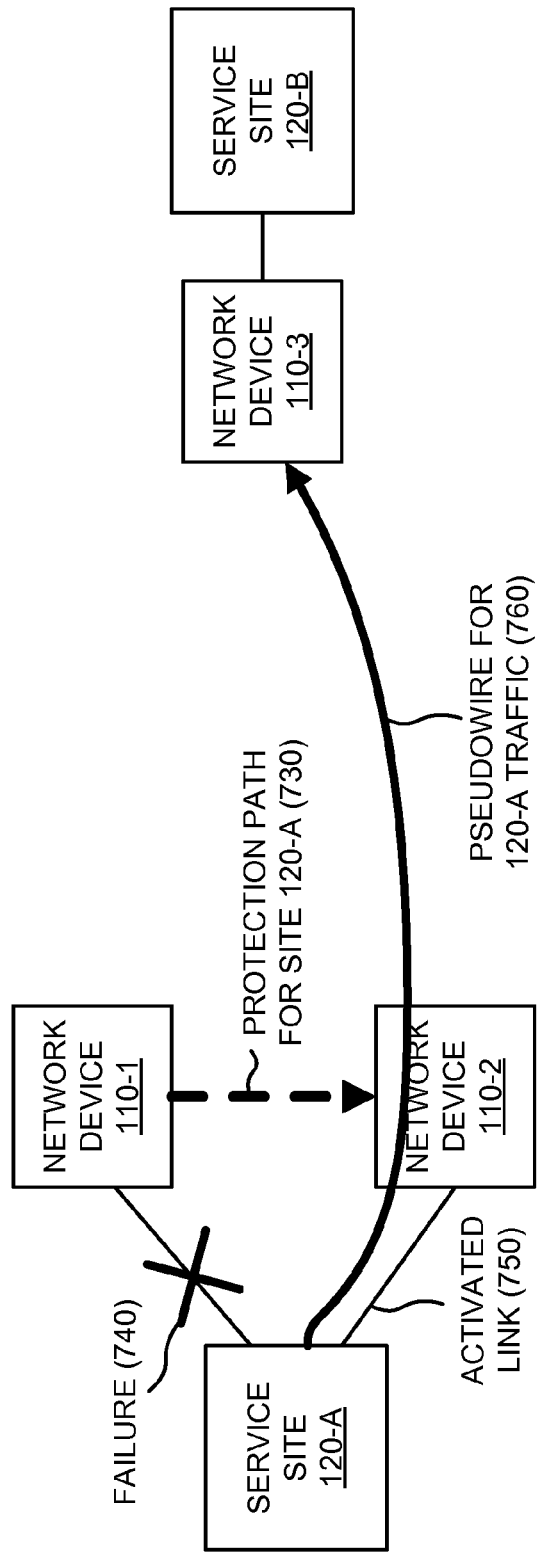

FIGS. 7A and 7B depict diagrams of exemplary interactions among components of still a further exemplary portion 700 of network 100. As shown in FIG. 7A, exemplary network portion 700 may include network devices 110-1, 110-2, and 110-3 and service sites 120-A and 120-B. Network devices 110-1, 110-2, and 110-3 and service sites 120-A and 120-B may include the features described above in connection with, for example, FIGS. 1-6.

With reference to FIG. 7A, exemplary network portion 700 may be in a steady state (e.g., a state where there are no link failures, network device failures, etc.), network device 110-1 may be a designated forwarder for service site 120-A, and network device 110-2 may be a non-designated forwarder for service site 120-A. In the steady state, a pseudowire 710 may be created between service sites 120-A and 120-B, via network devices 110-1 and 110-3, and a link between service site 120-A and network device 110-2 may not be activated, as indicated by reference number 720. In the steady state, a same label may be used by network device 110-1 and network device 110-2 to send traffic to network device 110-3, and, based on use of the same label, network device 110-3 may only create a state for incoming traffic from network device 110-1 (e.g., since network device 110-1 is the designated forwarder). Network device 110-2, in the steady state, may create a pseudowire (not shown) to send and/or receive traffic to/from network device 110-3.

As shown in FIG. 7B, network device 110-1 may create a protection path 730 from network device 110-1 to network device 110-2. If a failure 740 occurs in an access link between network device 110-1 and service site 120-A, service site 120-A may switch traffic from the access link between service site 120-A and network device 110-1 to an access link between service site 120-A and network device 110-2. In one exemplary implementation, if network device 110-1 detects a link failure 740 (e.g., via IEEE 802.3ah, 802.1ag, etc. mechanisms), network device 110-1 may provide a warning packet (e.g., a "cooked" packet) on protection path 730 to network device 110-2. Network device 110-2 may receive the cooked packet and may use receipt of the cooked packet via protection path 730 as a trigger to activate the access link between network device 110-2 and service site 120-A, as indicated by reference number 750. A pseudowire 760 may be created between service sites 120-A and 120-B, via network devices 110-2 and 110-3. Service site 120-A may flush all MAC states for the access link between service site 120-A and network device 110-1, and may provide traffic to service site 120-B via activated link 750 and network devices 110-2 and 110-3.

Although FIGS. 7A and 7B show exemplary components of network portion 700, in other implementations, network portion 700 may contain fewer, different, differently arranged, or additional components than depicted in FIGS. 7A and 7B. In still other implementations, one or more components of network portion 700 may perform one or more other tasks described as being performed by one or more other components of network portion 700.

Figure 8:
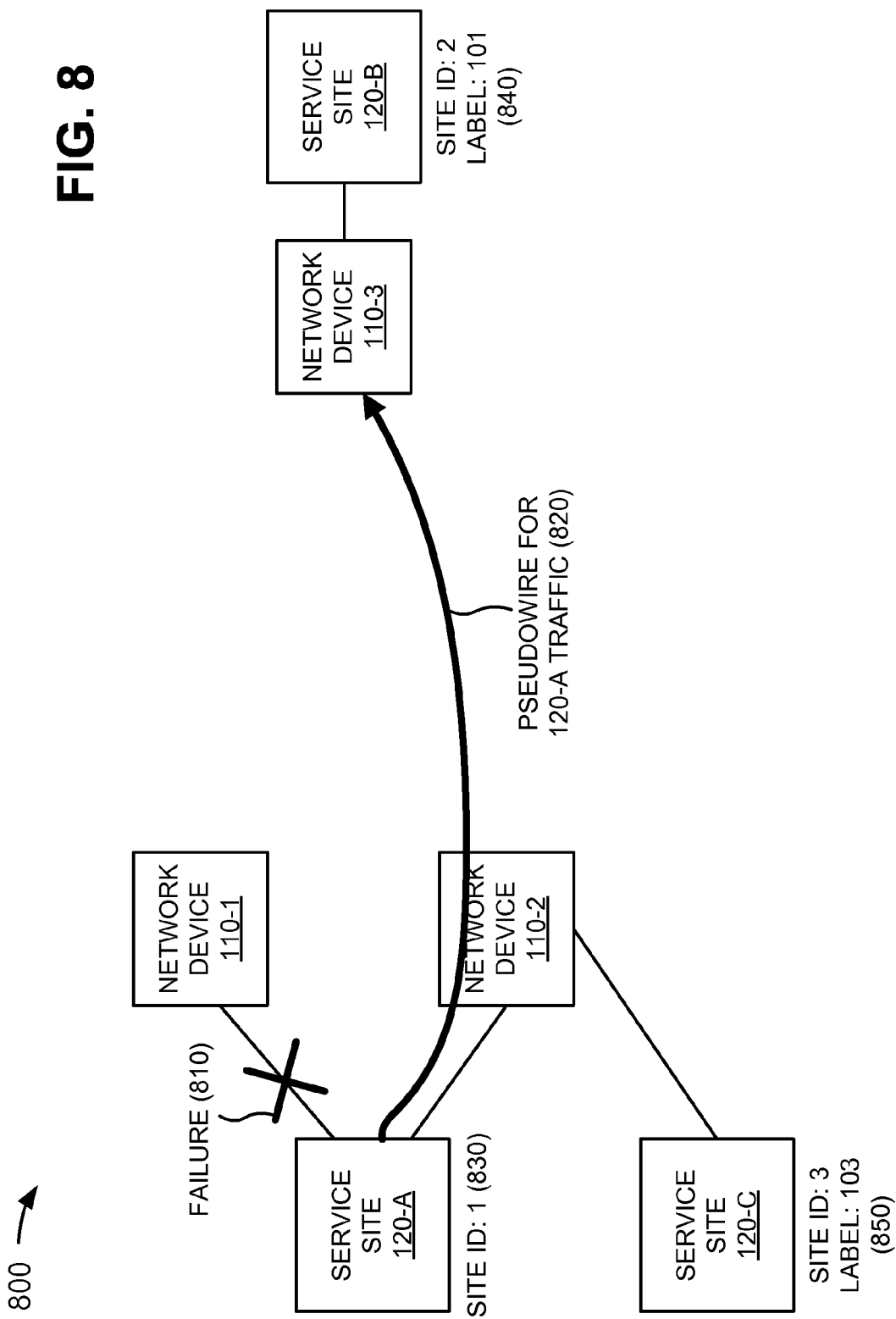
FIG. 8 illustrates a diagram of exemplary interactions among components of another exemplary portion of the network depicted in FIG. 1.

FIG. 8 illustrates a diagram of exemplary interactions among components of another exemplary portion 800 of network 100. As shown, exemplary network portion 800 may include network devices 110-1, 110-2, and 110-3 and service sites 120-A, 120-B, and 120-C. Network devices 110-1, 110-2, and 110-3 and service sites 120-A, 120-B, and 120-C may include the features described above in connection with, for example, FIGS. 1-7B.

As further shown in FIG. 8, if a failure 810 occurs in an access link between network device 110-1 and service site 120-A, service site 120-A may switch traffic from the access link between network device 110-1 and service site 120-A to an access link between service site 120-A and network device 110-2. A pseudowire 820 may be created between service sites 120-A and 120-B, via network devices 110-2 and 110-3, and may be used to provide traffic from service site 120-A to service site 120-B.

Service site 120-A may be associated with a site identification (ID) 830 (e.g., "1"). Service site 120-B may be associated with a site ID (e.g., "2") and a label (e.g., "101"), as indicated by reference number 840. Service 120-C may be associated with a site ID (e.g., "3") and a label (e.g., "103"), as indicated by reference number 850. In one exemplary implementation, network device 110-3 may map label "101" to network device 110-1, and network device 110-2 may use label "101" for traffic from service site 120-A to service site 120-B. Since network device 110-3 mapped label "101" to network device 110-1, network device 110-3 may consider traffic coming from network device 110-2 as if coming from network device 110-1. Network device 110-3 may continue to send traffic (e.g., for service site 120-A) to network device 110-1 until BGP converges. Network device 110-3 may map label "103" to network device 110-2, and network device 110-2 may use label "103" for traffic from service site 120-A to service site 120-B. Since network device 110-3 mapped label "103" to network device 110-2, network device 110-3 may recognize a MAC move and may begin sending traffic for service site 120-A to network device 110-2.

Although FIG. 8 shows exemplary components of network portion 800, in other implementations, network portion 800 may contain fewer, different, differently arranged, or additional components than depicted in FIG. 8. In still other implementations, one or more components of network portion 800 may perform one or more other tasks described as being performed by one or more other components of network portion 800.

Figure 9:
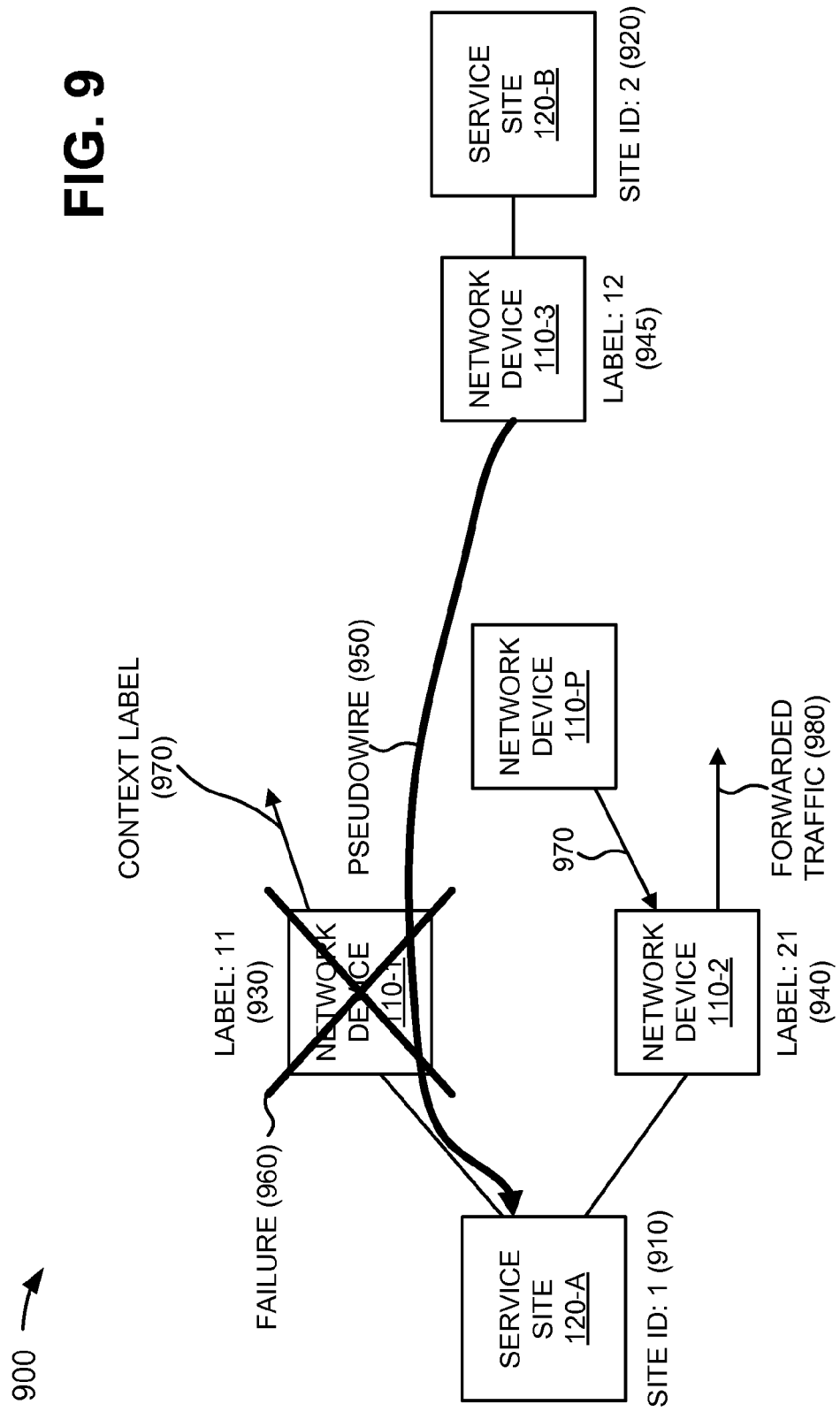
FIG. 9 depicts a diagram of exemplary interactions among components of yet another exemplary portion of the network illustrated in FIG. 1.

FIG. 9 depicts a diagram of exemplary interactions among components of yet another exemplary portion 900 of network 100. As shown, exemplary network portion 900 may include network devices 110-1, 110-2, 110-3, 110-P and service sites 120-A and 120-B. Network devices 110-1, 110-2, and 110-3 and service sites 120-A and 120-B may include the features described above in connection with, for example, FIGS. 1-8. Network device 110-P may include the features described above in connection with network devices 110. However, network device 110-P may correspond to a provider (or core) network device provided within network 130.

As further shown in FIG. 9, service site 120-A may be associated with a site ID 910 (e.g., "1"), and service site 120-B may be associated with a site ID 920 (e.g., "2"). Network device 110-1 may be associated with a label 930 (e.g., "11"), network device 110-2 may be associated with a label 940 (e.g., "21"), and network device 110-3 may be associated with a label 945 (e.g., "12"). A pseudowire 950 may be created between service sites 120-A and 120-B, via network devices 110-1 and 110-3, and may be used to provide traffic from service site 120-B to service site 120-A. However, if a failure 960 occurs in network device 110-1, traffic from service site 120-B may not reach service site 120-A via pseudowire 950. In the event of failure 960, network device 110-1 may generate a context label 970 (e.g., within network 130 (not shown)), and context label 970 may reach network device 110-P. Network device 110-P may provide context label 970 to network device 110-2. Context label 970 may provide a context lookup of VPLS labels. Network device 110-2 may receive context label 970 and may map traffic received with a label stack (e.g., that includes context label 970 and label "12") to service site 120-B. Network device 110-2 may forward traffic, as indicated by reference number 980, as if traffic included label "12."

Although FIG. 9 shows exemplary components of network portion 900, in other implementations, network portion 900 may contain fewer, different, differently arranged, or additional components than depicted in FIG. 9. In still other implementations, one or more components of network portion 900 may perform one or more other tasks described as being performed by one or more other components of network portion 900.

Exemplary Processes

Figure 10:
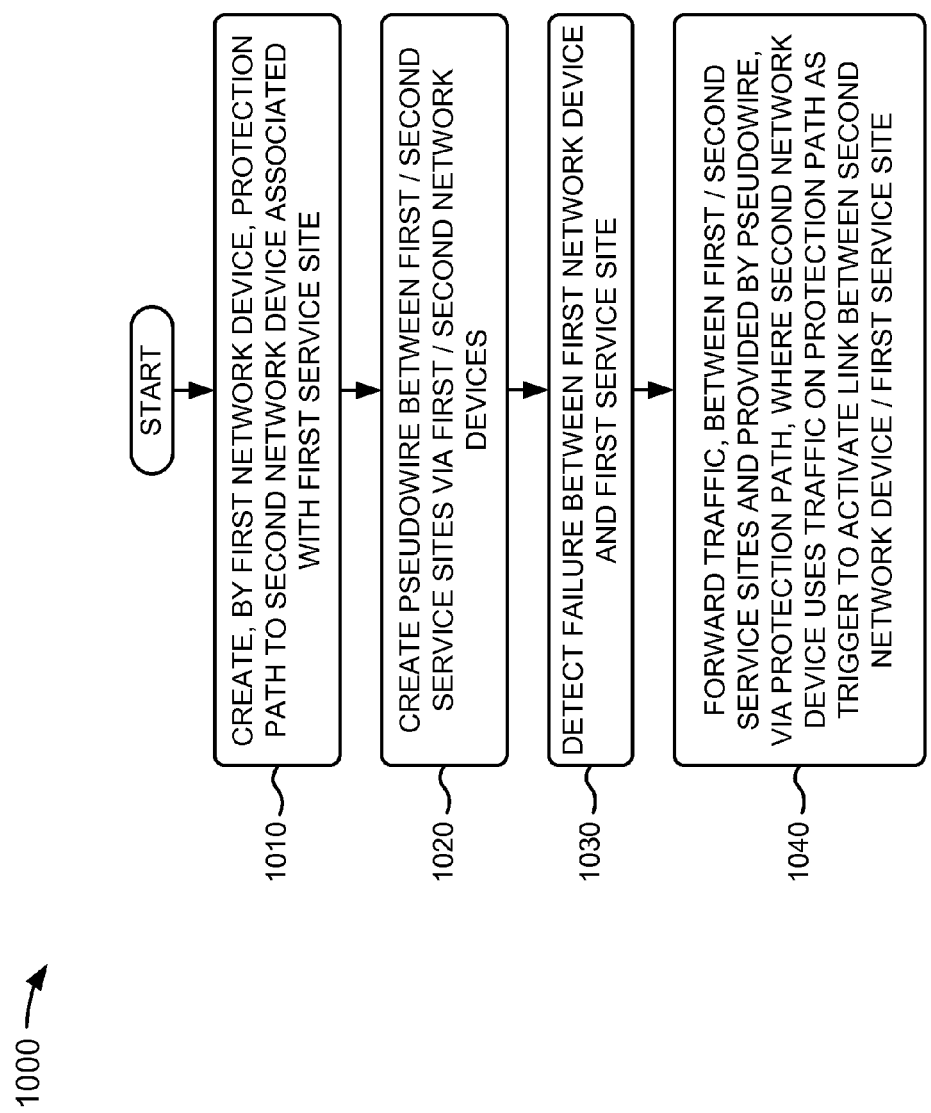
FIGS. 10 and 11 illustrate flow charts of an exemplary process for providing fast and deterministic service restoration in case of access link and/or PE node failures according to implementations described herein.
Figure 11:

FIGS. 10 and 11 illustrate flow charts of an exemplary process 1000 for providing fast and deterministic service restoration in case of access link and/or PE node failures according to implementations described herein. In one implementation, process 1000 may be performed by one of network devices 110. In another implementation, some or all of process 1000 may be performed by another device or group of devices, including or excluding one of network devices 110.

As illustrated in FIG. 10, process 1000 may include creating, by a first network device, a protection path to a second network device associated with a first service site (block 1010), and creating a pseudowire between the first service site and a second service site via the first network device and the second network device (block 1020). For example, in implementations described above in connection with FIG. 1, network device 110-1 may create protection path 160 to network device 110-2, and pseudowire 170 may be created between service sites 120-A and 120-B via network devices 110-1, 110-2, and 110-3. Pseudowire 170 may include a mechanism that emulates various networking or telecommunications services across packet-switched networks that use Ethernet, IP, MPLS, etc.

As further shown in FIG. 10, a failure may be detected between the first network device and the first service site (block 1030), and traffic, between the first service site and the second service site and provided by the pseudowire, may be forwarded via the protection path, where the second network device uses traffic on the protection path as a trigger to activate a link between the second network device and the first service site (block 1040). For example, in implementations described above in connection with FIG. 1, network device 110-1 may detect link failure 150 (e.g., via IEEE 802.3ah, 802.1ag, etc. mechanisms), and may forward traffic 140, via protection path 160 and pseudowire 170, to network device 110-2. Network device 110-2 may receive traffic 140 and may use receipt of traffic 140 via protection path 160 as a trigger to activate an access link between network device 110-2 and service site 120-A. Network device 110-2 may provide traffic 140 to service site 120-A via the activated link.

Process block 1030 may include the process blocks depicted in FIG. 11. As shown in FIG. 11, process block 1030 may include detecting a link failure between the first network device and the first service site (block 1100), and providing a packet to the second network device via the protection path, where the second network device uses receipt of the packet as a trigger to activate a link between the second network device and the first service site (block 1110). For example, in implementations described above in connection with FIG. 3, if network device 110-1 detects link failure 350 (e.g., via IEEE 802.3ah, 802.1ag, etc. mechanisms) in the access link between network device 110-1 and service site 120-A, network device 110-1 may provide a warning packet (e.g., a "cooked" packet) on protection path 310 to network device 110-2. Network device 110-2 may receive the cooked packet and may use receipt of the cooked packet via protection path 310 as a trigger to activate an access link between network device 110-2 and service site 120-A.

Alternatively, as shown in FIG. 11, process block 1030 may include detecting a failure of the first network device (block 1120), and using context labels to forward traffic between the first service site and the second service site (block 1130). For example, in implementations described above in connection with FIG. 9, if failure 960 occurs in network device 110-1, traffic from service site 120-B may not reach service site 120-A via pseudowire 950. In the event of failure 960, network device 110-1 may generate context label 970 (e.g., within network 130), and context label 970 may reach network device 110-P. Network device 110-P may provide context label 970 to network device 110-2. Context label 970 may provide a context lookup of VPLS labels. Network device 110-2 may receive context label 970 and may map traffic received with a label stack (e.g., that includes context label 970 and label "12") to service site 120-B. Network device 110-2 may forward traffic, as indicated by reference number 980, as if traffic included label "12."

FIG. 12 depicts a flow chart of an exemplary process 1200 for providing fast and deterministic service restoration via a redundant PE node according to implementations described herein. In one implementation, process 1200 may be performed by one of network devices 110. In another implementation, some or all of process 1200 may be performed by another device or group of devices, including or excluding one of network devices 110.

As illustrated in FIG. 12, process 1200 may include establishing a protection path between a first network device and a second network device associated with a first service site, where the first network device is a non-designated forwarder device (block 1210), and creating a non-forwarding state link between the first network device and the first service site (block 1220). For example, in implementations described above in connection with FIG. 1, network device 110-1 may create protection path 160 to network device 110-2. If network device 110-2 is a non-designated forwarder to service site 120-A, a link between network device 110-2 and service site 120-A may initially be in a non-forwarding state. While the link between network device 110-2 and service site 120-A is in the non-forwarding state, network device 110-2 may not forward traffic received from remote PE network devices or from attached service sites (e.g., service site 120-C) on the non-forwarding state link. Network device 110-2 may install a discard next hop for the non-forwarding state link so that traffic received on the non-forwarding state link will be dropped as long as the link is in the non-forwarding state.

As further shown in FIG. 12, traffic from the second service site may be received on the protection path (block 1230), activation of the non-forwarding state link to a forwarding state link may be triggered based on receipt of the traffic on the protection path (block 1240), traffic may be forwarded to the first service site via the forwarding state link (block 1250), and traffic from the first service site to the second service site may be provided via the forwarding state link (block 1260). For example, in implementations described above in connection with FIG. 1, network device 110-1 may detect link failure 150 (e.g., via IEEE 802.3ah, 802.1ag, etc. mechanisms), and may forward traffic 140, via protection path 160 and pseudowire 170, to network device 110-2. Network device 110-2 may receive traffic 140 and may use receipt of traffic 140 via protection path 160 as a trigger to activate the access link between network device 110-2 and service site 120-A. Network device 110-2 may provide traffic 140 to service site 120-A via the activated link. When the link between network device 110-2 and service site 120-A is activated, the link may be in a forwarding state and network device 110-2 may forward traffic via the activated link.

CONCLUSION

Systems and/or methods described herein may provide fast and deterministic service restoration in case of access link failures (e.g., type (1) failures) and/or PE node failures (e.g., type (2) failures). The systems and/or methods may be applicable to BGP-based VPLS, LDP-based VPLA, and BGP-based L2VPN.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 10-12, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A first network device, comprising:
a memory to store a plurality of instructions; and
a processor to execute instructions in the memory to:
create a protection path to a second network device associated with a first service site,
create a pseudowire between the first service site and a second service site via the first network device and the second network device,
detect a failure between the first network device and the first service site,
forward first traffic, provided by the pseudowire between the first service site and the second service site, via the protection path, where the first traffic is traffic associated with one source and one destination, and
drop second traffic, where the second traffic is traffic associated with one source and a plurality of destinations.

2. The first network device of claim 1, where:
the first network device is a designated forwarder device for the first service site, and
the second network device is a non-designated forwarder device for the first service site.

3. The first network device of claim 1, where, when detecting a failure between the first network device and the first service site, the processor is further to:
detect a failure of a link between the first network device and the first service site, and
provide a particular packet to the second network device via the protection path, where the second network device uses receipt of the particular packet as the trigger to activate a link between the second network device and the first service site.

4. The first network device of claim 1, where, when detecting a failure between the first network device and the first service site, the processor is further to:
detect a failure of the first network device, and
use context labels to forward the first traffic between the first service site and the second service site.

5. The first network device of claim 1, where the processor is further to:
restore communication between the first service site and the second service site, via the protection path.

6. The first network device of claim 1, where the first network device comprises one or more of:
a gateway,
a router,
a switch,
a firewall,
a network interface card (NIC),
a hub,
a bridge,
a proxy server, or
an optical add-drop multiplexer (OADM).

7. A first network device, comprising:
a memory to store a plurality of instructions; and
a processor to execute instructions in the memory to:
establish a protection path with a second network device associated with a first service site,
create a non-forwarding state link between the first network device and the first service site,
receive traffic from the second network device on the protection path,
trigger activation of the non-forwarding state link to a forwarding state link based on receipt of the traffic,
forward first traffic from a second service site to the first service site via the forwarding state link, where the first traffic is traffic associated with one source and one destination, and
drop second traffic, where the second traffic is traffic associated with one source and a plurality of destinations.

8. The first network device of claim 7, where:
the first network device is a non-designated forwarder device for the first service site, and
the second network device is a designated forwarder device for the first service site.

9. The first network device of claim 7, where the traffic from second network device comprises a particular packet generated by the second network device when the second network device detects a failure of a link between the second network device and the first service site, and where the processor is further to:
receive the particular packet via the protection path, and
use receipt of the particular packet as the trigger to activate the non-forwarding state link to a forwarding state link.

10. The first network device of claim 7, where the processor is further to:
restore communication between the first service site and the second service site, via the protection path.

11. The first network device of claim 7, where the first network device comprises one or more of:
- a gateway,
- a router,
- a switch,
- a firewall,
- a network interface card (NIC),
- a hub,
- a bridge,
- a proxy server, or
- an optical add-drop multiplexer (OADM).

12. The first network device of claim 7, where the first network device and the second network device provide a virtual private local area network service (VPLS) to the first service site and the second service site.

13. The first network device of claim 12, where the first network device and the second network device are associated with one or more of:
- a border gateway protocol (BGP)-based VPLS,
- a label distribution protocol (LDP)-based VPLS, or
- a BGP-based layer 2 virtual private network (L2VPN).

14. A network device-implemented method, comprising:
- creating, by the network device, a protection path to another network device associated with a first service site;
- creating a pseudowire between the first service site and a second service site via the network device and the other network device;
- detecting, by the network device, a failure between the network device and the first service site;
- forwarding, by the network device, first traffic, provided by the pseudowire between the first service site and the second service site, via the protection path, where the first traffic is traffic associated with one source and one destination; and
- dropping, by the network device, second traffic, where the second traffic is traffic associated with one source and a plurality of destinations.

15. The network device-implemented method of claim 14, where detecting a failure between the network device and the first service site further comprises:
- detecting a failure of a link between the network device and the first service site; and
- providing a particular packet to the other network device via the protection path, where the other network device uses receipt of the particular packet as the trigger to activate a link between the other network device and the first service site.

16. The network device-implemented method of claim 14, where detecting a failure between the network device and the first service site further comprises:
- detecting a failure of the network device; and
- using context labels to forward traffic between the first service site and the second service site.

17. The network device-implemented method of claim 14, further comprising:
- restoring communication between the first service site and the second service site, via the protection path.

18. A network device-implemented method, comprising:
- establishing, by the network device, a protection path with another network device associated with a first service site, where the network device is a non-designated forwarder device for the first service site, and the other network device is a designated forwarder device for the first service site;
- creating, by the network device, a non-forwarding state link between the network device and the first service site;
- receiving, by the network device, traffic from the other network device on the protection path;
- triggering, by the network device, activation of the non-forwarding state link to a forwarding state link based on receipt of the traffic;
- forwarding, by the network device, first traffic from a second service site to the first service site via the forwarding state link, where the first traffic is traffic associated with one source and one destination; and
- dropping, by the network device, second traffic, where the second traffic is traffic associated with one source and a plurality of destinations.

19. The network device-implemented method of claim 18, where the traffic from other network device comprises a particular packet generated by the other network device when the other network device detects a failure of a link between the other network device and the first service site, and where the method further comprises:
- receiving the particular packet via the protection path; and
- using receipt of the particular packet as the trigger to activate the non-forwarding state link to a forwarding state link.

20. The network device-implemented method of claim 18, further comprising:
- restoring communication between the first service site and the second service site, via the protection path, within about ten to ninety-nine milliseconds.

21. The network device-implemented method of claim 18, where the network device and the other network device provide a virtual private local area network service (VPLS) to the first service site and the second service site.

22. The network device-implemented method of claim 18, where the network device and the other network device are associated with one or more of:
- a border gateway protocol (BGP)-based virtual private local area network service (VPLS),
- a label distribution protocol (LDP)-based VPLS, or
- a BGP-based layer 2 virtual private network (L2VPN).

* * * * *